United States Patent (10) Patent No.: US 12,242,008 B2
Laws et al. (45) Date of Patent: Mar. 4, 2025

(54) SYSTEM AND METHOD FOR CHARACTERIZING A SEISMIC ACOUSTIC SIGNAL (71) Applicant: Reflection Marine Norge AS, Laksevåg (NO)

(72) Inventors: Robert M. Laws, Cambridge (GB); Kambiz Iranpour, Oslo (NO)

(73) Assignee: Reflection Marine Norge AS, Laksevåg (NO)

( * ) Notice: Subject to any disclaimer, the term of this patent is extended or adjusted under 35 U.S.C. 154(b) by 433 days.

(21) Appl. No.: 17/716,475

(22) Filed: Apr. 8, 2022

(65) Prior Publication Data
US 2022/0342102 A1 Oct. 27, 2022

Related U.S. Application Data (60) Provisional application No. 63/176,580, filed on Apr. 19, 2021.

(51) Int. Cl.
G01V 1/36 (2006.01)
G01V 1/38 (2006.01)
(52) U.S. Cl.
CPC ............ G01V 1/362 (2013.01); G01V 1/3808 (2013.01); G01V 1/3843 (2013.01)
(58) Field of Classification Search
CPC ..... G01V 1/362; G01V 1/3808; G01V 1/3843
See application file for complete search history.

(56) References Cited

U.S. PATENT DOCUMENTS

| 6,035,257 | A | 3/2000 | Epperson |
| 9,459,362 | B2 | 10/2016 | Laws |
| 10,598,806 | B2 | 3/2020 | Davison et al. |
| 2014/0204701 | A1* | 7/2014 | Teyssandier ............. G01V 1/28 367/7 |

(Continued)

FOREIGN PATENT DOCUMENTS

| EP | 2267486 A2 | 12/2010 |
| EP | 2626727 A2 | 8/2013 |

(Continued)

OTHER PUBLICATIONS

International Search Report for PCT/NO2022/050084; issued Feb. 11, 2022.

(Continued)

*Primary Examiner* — Krystine E Breier
(74) *Attorney, Agent, or Firm* — Flener IP & Business Law; Zareefa B. Flener (57) ABSTRACT

A method for correcting for distortions in a seismic acoustic wavefield produced by a seismic vibrator that is immersed in a fluid, the method comprising: applying a pilot signal to the vibrator such that an acoustic wavefield travels outwards from the interface between the vibrator outer surface and the fluid: using a sensor located within the fluid so as to be sensitive to a property of the wavefield in the fluid to monitor the property of the wavefield as a function of time: and using the measured property to determine a change in wet volume of a component of the vibrator as a function of time V(t) or derivatives of V(t), and using the determined wet volume V(t) or its derivatives to correct for distortions in the seismic data produced by the vibrator.

6 Claims, 5 Drawing Sheets

(56) References Cited

U.S. PATENT DOCUMENTS

| 2014/0283615 A1* | 9/2014 | Laws | G01V 1/135 73/662 |
|---|---|---|---|
| 2017/0371070 A1* | 12/2017 | Teyssandier | G01V 13/00 |
| 2019/0113644 A1 | 4/2019 | Söllner et al. | |

FOREIGN PATENT DOCUMENTS

| EP | 3087415 A2 | 11/2016 |
|---|---|---|
| EP | 3090283 A1 | 11/2016 |
| EP | 3264142 A1 | 1/2018 |

OTHER PUBLICATIONS

Benoît Teyssandier; The shape of things to come—Development and testing of a new marine vibrator source; The Leading Edge; Sep. 1, 2019; pp. 680-690; vol. 38, No. 9; online.

* cited by examiner

SYSTEM AND METHOD FOR CHARACTERIZING A SEISMIC ACOUSTIC SIGNAL

TECHNICAL FIELD

The present invention relates to a system and a method for characterizing a seismic signal, and in particular to methods and systems for reducing the effects of distortions in a seismic acoustic wavefield, such as by estimating a far field including distortions. The present invention relates to the use of measurements in a fluid adjacent a seismic vibrator outer surface for reducing the effects of distortions or for determining the extent of distortions in a seismic signal.

BACKGROUND

During a marine seismic survey, an array of acoustic sources is either pulled through the water behind a survey vessel coupled to a series of towed streamers, or the sources forming the array are placed on or above the sea floor at optimum locations. Acoustic signals or pulses, which are emitted by the sources in the array, travel to the sub-surface and are reflected at boundaries between materials having different properties. The reflected signals are detected by a number of seismic receivers and processed to extract information about the structure of the sub-surface. This information is valuable for many reasons, one of which being that it is usable to identify reservoirs of hydrocarbons.

The acoustic sources used in such surveys are of various types. Air gun bubbles, which work via the release of compressed air from a chamber producing a pulse of acoustic energy, have more traditionally been used in marine seismic surveys. In recent years, seismic vibrators have also become increasingly prominent and their application to marine seismic surveys has undergone significant development. A marine seismic vibrator works by creating volume fluctuations which are coupled to the water or fluid surrounding the device, and this is generally achieved by mechanically changing its shape. Typically, the volume of the device is made to fluctuate by a mechanical or electro-mechanical mechanism. The shape will also vary. For example, in a flextensional vibrator (Tengham, 2000) a flexible shell is bent by a contracting mechanism which causes the shell to bulge, thereby changing the volume of the device. In a single-sided piston vibrator (Haldorsen 1985, IVI 1985) a radiator plate is moved by a hydraulic actuator inside the device. In a vibrator based on a stack of constrictive layers a stack of springy enclosed disks is compressed, and in a double piston vibrator two pistons move in opposite directions, each being driven by an electro-hydraulic actuator.

Figure 1:
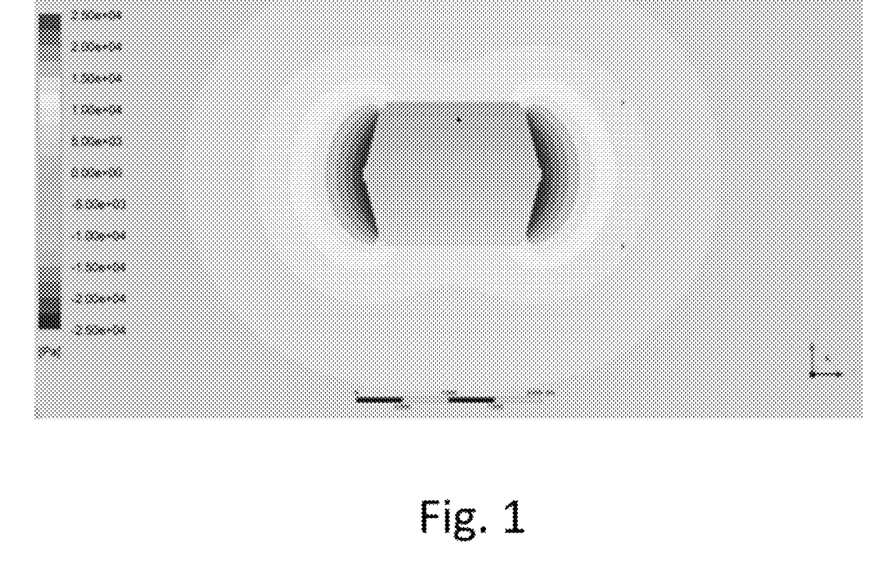
FIG. 1 shows a wavefield produced by a double piston vibrator.

Unlike air gun bubbles, typical marine seismic vibrators are not spherical, nor are they negligibly small compared with the wavelengths of the sound that they emit. A typical marine vibrator has a spatial dimension of several metres and $\lambda/2\pi$ (the inverse of the wave number) at 150 Hz is 1.6 metres. While airgun bubbles can be considered as point sources for many aspects of their acoustic output, since they are basically spherical in form and are small compared with $\lambda/2\pi$, a seismic vibrator has a finite volume which must be accounted for when predicting a resulting wavefield. The volume or wet volume $V(t)$ of a vibrator is used herein to describe the volume of the region enclosed by an imaginary skin that lies at the interface between the mechanical device and the surrounding water. This volume also has a shape which varies with time, $S(t)$. For example, in an idealised double piston vibrator the shape is a cylinder of constant radius (r) whose length (L) fluctuates with time, the volume is $V(t)=2\pi \cdot r^2 \cdot L(t)$. The pressure changes in the fluid surrounding a double piston vibrator, these changes being representative of the acoustic wavefield produced by a double piston vibrator, is illustrated in FIG. 1.

When a marine seismic vibrator is to be actuated, a pilot signal defining the waveform that the device should attempt to emit is sent to the device. The pilot signal might represent the desired volume, the extension of some mechanical part, the desired Notional Source signature (Ziolkowski et al, 1982 and 1984) or some other quantity. The pilot signal directly or indirectly defines the required acoustic output of the device. The pilot signal might be a swept-frequency sinusoid, but it does not have to be.

In most cases a servomechanism is designed to follow the pilot signal, or some function of it, and the motion of the servomechanism it is converted to a volume change by the mechanical design of the vibrator. It is the volume change that causes the radiation of sound. The actuating mechanism is usually inside the device itself, but it does not have to be.

In practice, however, the changing shape of the vibrator does not exactly follow the pilot signal, and so the wavefield resulting from activation of the source is not exactly as expected. This is a result of properties of the vibrator itself, including imperfections introduced during the manufacturing process which may vary between vibrators in a survey. It is also very difficult to predict exactly how a vibrator will respond to a particular pilot signal in particular conditions and the resulting wavefield is also unpredictable as a result. This inherent behaviour of the vibrator creates a nonlinearity in the output which corresponds to the distortion. As a result of these small imperfections and unpredictable behaviour of the device the quality of the data from the survey can be negatively affected. If the pilot signal is sinusoidal then the distortion will be in the form of harmonics in the signal.

There is a benefit in knowing what the actual emitted acoustic signal is, even if it is distorted. This is because the information can be used in the processing of the resulting seismic data and the effect of the distortion can in this way be mitigated. Other methods for reducing the effect or extent of these distortions are also desirable.

US-A-2014/0283615 describes a method for estimating the notional source of the vibrators using accelerometers mounted on the driving surfaces. For one degree of freedom (1DF) vibrators with simple mechanisms it is possible to measure $V(t)$ using accelerometers mounted on the body of the vibrator, however one practical difficulty with this method is that resonances in the structure local to the accelerometers can lead to errors in the estimated volume and this leads to error in the estimated pressure. In addition, it can be that the volume is not a linear function of the radiator displacement. For example, there might be a flexible seal, between the radiator and the body of the vibrator, whose volume is not proportional to the radiator position. This method may not, therefore, provide an accurate estimate of the volume changes with time.

U.S. Pat. No. 4,476,553 describes a method for determining the notional source signatures of an array of airgun bubbles. Because the bubbles could be assumed to be spherical point sources, the question of the description of the wavefields including distortions never arises. All the fields are monopole fields and there is no pilot signal applied. Instead, the bubbles each oscillate freely. This method cannot be directly applied to marine vibrators because vibrators are not monopoles, but have a shape that produces a sound field that cannot be simply extrapolated from near to far as if it were a monopole. In addition, the question of distortion, which is very important in marine vibrators, does not arise in the case of airguns.

SUMMARY

According to a first aspect of the present invention, there is provided a method for correcting for distortions in a seismic acoustic wavefield produced by a seismic vibrator that is immersed in a fluid, the method comprising: applying a pilot signal to the vibrator such that an acoustic wavefield travels outwards from the interface between the vibrator outer surface and the fluid: using a sensor located within the fluid so as to be sensitive to a property of the wavefield in the fluid to monitor the property of the wavefield as a function of time: using the measured property to determine a change in wet volume of a component of the vibrator as a function of time V(t) or derivatives of V(t), and using the determined wet volume V(t) or its derivatives to correct for distortions in the seismic data produced by the vibrator.

Correcting for distortions may comprise substantially removing distortions in the signal, applying a correction to the seismic data during post-processing, and may in some cases involve adjusting the pilot signal to minimise distortions in the emitted wavefield. A distortion profile or correction profile for the device is determined using measurements of a property of the wavefield in a fluid surrounding the device. This profile may comprise the emitted acoustic wavefield including distortions. This is a particularly accurate and simple way to allow for the correction of distortions in vibrators having more complex shapes. Since the correction to be applied in many cases only needs to be determined once for each device, and since the method can be carried out using a minimal number of sensors (in most cases one sensor and one measurement position per degree of freedom of the device), this is also an extremely efficient method. The calculation of a wet volume from the near field also allows a much more accurate estimation of the far field to be calculated, even in a case where the vibrator is a multiple degree of freedom (DF) device and the near field is fairly complex.

In embodiments, the sensor is displaced or separated from the outer surface of the device. Reference to the sensor being displaced or separated from the outer surface of the device refers to the fact that there is fluid between the sensor and the outer surface of the vibrator. In some embodiments the sensor may be within a separate unit from the vibrator and as such may not be physically coupled to it. In some embodiments, however, the sensor may be coupled to the vibrator. The coupling may be via an additional frame or some additional structure. The sensor can therefore be an integral part of, or be attachable to, the vibrator, but in this case the sensor itself will still be configured and positioned to measure a property of the wavefield in the fluid, or the effects of the wavefield on the fluid surrounding the vibrator. The sensor can be configured to extend a certain distance from the outer surface of the vibrator coupled to the vibrator by the additional structure, for example. In some cases, the sensor can be located inwards of the vibrator outer shell or body, and a fluid passage or chamber provided within the vibrator in which the sensor is located. The passage or chamber is in fluid connection with and can fill with the fluid surrounding the vibrator such that the sensor is configured to measure properties thereof. In embodiments, the fluid is seawater. In embodiments, the sensor is a hydrophone and the measured property is a pressure of the fluid. In embodiments, the vibrator is one of an array of marine vibrators.

In embodiments, the vibrator is one of an array of marine vibrators and the fluid is water. In embodiments, the sensor is a hydrophone and the measured property is a pressure of the fluid. In embodiments, the sensor is an accelerometer and the measured property is an acceleration of the fluid.

In embodiments, the sensor is located a distance that is equal to or less than around 5 m from the outer surface of the vibrator, or located inwards of the shell or body of the vibrator, and the method comprises applying a pre-determined impulse response to the sensor measurement to determine the wet volume of the vibrator component as a function of time V(t) or derivatives of V(t). The sensor may be located at a distance that is between 0.5 m and 5 m from the outer surface of the vibrator, preferably between 1 m and 5 m from the outer surface of the vibrator.

In embodiments, the sensor is coupled to the vibrator via additional structure including a fluid passage configured to be filled with the fluid to be monitored. This allows properties of the fluid in which the vibrator is immersed to be monitored using the sensor whilst still ensuring a compact configuration for the vibrator and distortion correction system.

In embodiments, the impulse response is a linear component operator. The operator may be applied directly in that it is applied only once to the output of the sensor resulting in the wet volume as a function of time or derivatives thereof.

In embodiments, the impulse response is determined using computer simulation of the acoustic behaviour of the fluid and the shape of the vibrator component.

In embodiments, the method comprises determining the shape of the vibrator component as a function of time, S(t), from V(t) or derivatives thereof, and using S(t) to derive one or more properties of a far wavefield produced by the vibrator in the far-field. The far-field may correspond to a distance greater than around 5 meters from the outer surface of the vibrator.

In embodiments, correcting for distortions comprises using the calculated far wavefield to account for distortions in the signal during processing of the seismic data. In embodiments, the processing uses source signature deconvolution.

In embodiments, the vibrator is a multi-component vibrator, and the method is performed separately in respect of each component using at least one sensor per component. The sensors may each be located within the fluid, separated from the vibrator outer surface and separated from each other.

In embodiments, the vibrator comprises four components, and the sensors may comprise two accelerometers mounted on the vibrator for monitoring an acceleration of fluid particles in the fluid surrounding the vibrator and two hydrophones for monitoring a pressure of the fluid surrounding the vibrator. In embodiments, the vibrator comprises four components and the four sensors comprise accelerometers for monitoring an acceleration of fluid particles in the fluid surrounding the vibrator.

In embodiments, the vibrator comprises four components and the four sensors comprise four hydrophones for monitoring a pressure of the fluid surrounding the vibrator.

In embodiments, the method comprises determining a relationship between the pilot signal as a function of time q(t) and the determined volume as a function of time V(t). In embodiments, the sensor is located a distance of more than around 5 meters from the outer surface of the vibrator. In embodiments, the sensor is located a distance from the outer surface of the vibrator that is sufficiently large for the acoustic wavefield to be characterizable in a simple way (e.g., represented by two monopoles or another simple approximation) without an error in excess of 0.5 Db. A typical distance above which this can be done is around 5 meters. This is true for a device of around 2 meters in size and operating up to around 150 Hz. For different sizes of vibrator operated at different frequencies or in different frequency ranges, the distance above which a simple characterization of the wavefield is possible with an error equal to or less than 0.5 Db may be more or less than 5 meters.

In embodiments, correcting for distortions comprises, based on the determined relationship, applying a nonlinear transformation, T, to the pilot signal so that the component volume V(t) becomes a linear function of the original pilot signal.

In embodiments, the pilot signal is a sinusoidal signal having a frequency f, and the method comprises determining how much excess energy is present in the wavefield at harmonic frequencies which are integral multiples of f using the sensor measurement.

In embodiments, correcting for distortions comprises adjusting the pilot signal to apply a cancellation signal such that the excess energy present in the signal at each of the harmonic frequencies is at or close to zero.

In embodiments, the sensor may be displaced or separated from the outer surface of the vibrator. Reference to the sensor being displaced or separated from the outer surface of the device refers to the fact that there is fluid between the sensor and the outer surface of the vibrator, movement of the outer surface affects properties of the fluid (such as a pressure in the fluid), and it is the properties of the fluid that are measured by the sensor rather than movement of the outer surface directly. The sensor itself may be coupled to the vibrator via additional structure in some cases, but the sensor itself will be configured and positioned to measure a property of the wavefield in the fluid, or the effects of the wavefield on the fluid surrounding the vibrator. The additional structure may comprise a fluid passage which will be filled during use of the vibrator by a volume of the fluid in which the vibrator is immersed. The sensor may measure properties of this volume of fluid. This is a convenient way to achieve the required measurements of fluid properties near to the vibrator outer surface during use.

According to a second aspect of the present invention, there is provided a method for correcting for distortions in a seismic acoustic wavefield produced by a seismic vibrator that is immersed in a fluid, the method comprising: applying a sinusoidal pilot signal having a frequency f to the vibrator such that an acoustic wavefield travels outwards from the interface between the vibrator outer surface and the fluid; using a sensor located within the fluid so as to be sensitive to a property of the wavefield in the fluid to monitor the property of the wavefield as a function of time: using the measured property to correct for distortions in the seismic data produced by the vibrator; determining how much excess energy is present in the wavefield at harmonic frequencies which are integral multiples off using the sensor measurement. The same process may be carried out for signals at different frequencies for application to a pilot signal which does not have a constant frequency. The resulting corrections applied to a swept frequency signal in some cases, for example, wherein the correction can be applied for a range of frequencies within the swept frequency signal centered on or including the frequency of signal for which the correction was determined.

In embodiments, correcting for distortions comprises adjusting the pilot signal to apply a cancellation signal such that the excess energy present in the signal at each of the harmonic frequencies is at or close to zero.

In embodiments, the excess energy is identified, and a corresponding cancellation signal applied to the pilot signal starting at the lowest harmonic frequency and proceeding up to higher frequencies in turn.

According to a third aspect of the present invention, there is provided, a method for correcting for distortions in a seismic acoustic signal produced by a seismic vibrator immersed in a fluid, the method comprising: determining a relationship between the pilot signal as a function of time q(t) and the wet volume as a function of time V(t); and based on the determined relationship, applying a non-linear transformation, T, to the pilot signal so that the volume V(t) becomes a linear function of the modified pilot signal.

In embodiments, determining the relationship between the pilot signal and the wet volume, and thus determining the non-linear transformation to apply, comprises performing a computer simulation of the behaviour of the vibrator.

In embodiments, the non-linear transformation is determined by experiment. In embodiments, the non-linear transformation is determined by applying a pilot signal to the vibrator such that an acoustic wavefield travels outwards from the interface between the vibrator outer surface and the fluid, using a sensor to monitor a property of the wavefield within the fluid as a function of time, using the measured property to determine a wet volume of the vibrator as a function of time V(t), and determining the non-linear transformation from V(t) and the pilot signal q(t).

In embodiments, the sensor is located at a distance of greater than 5 m from the vibrator outer surface and the fluid is water. In embodiments, the sensor is a hydrophone.

According to a fourth aspect of the present invention, there is provided a system configured to perform the method of any of the first, second, and third aspect.

DRAWINGS

Embodiments of the present invention will now be described, by way of example only, with reference to the following diagrams wherein.

DETAILED DESCRIPTION

The systems and methods described herein make use of the fact that water is a linear medium, and that the vibrators will be submerged during a survey to determine a distortion profile for each vibrator which can be used to mitigate or eliminate the effects of the distortion. A linear medium refers to the fact that signals within the medium can be treated in a linear fashion (output when two input signals are added is equal to the sum of the outputs for the two separate input signals). A "linear medium" is therefore a propagation medium (i.e., water in this case) having the property that if the wavefield a(x, y, z, t) is a solution and b(x, y, z, t) is a solution then c=a+b is also a solution. Herein a near-wavefield refers to a wavefield within a volume surrounding the vibrator within which the acoustic wavefield cannot be described by a simple approximation (for example by approximating the field as originating from a number of simple monopoles) with a sufficiently low error (an error below 0.5 dB, for example. A far-wavefield in this context refers to the wavefield within a volume surrounding the vibrator at or above a certain distance from the vibrator and within which the acoustic wavefield can be approximated by a simple approximation (for example by approximating the field as originating from a number of simple monopoles) with a sufficiently low error (i.e., an error below 0.5 dB).

The distance above which a simple approximation can be applied with an error of 0.5 dB or less may be around 5 meters from the vibrator outer surface. A far-wavefield in such a case refers to a wavefield in a volume surrounding the vibrator at a distance of more than 5 meters from the vibrator outer surface. The distance will, however, depend on properties of the vibrator.

Figure 2:
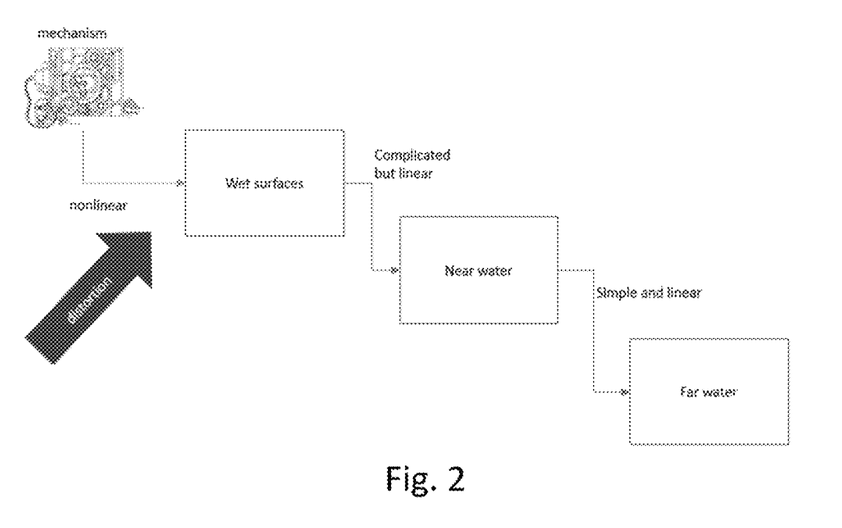
FIG. 2 illustrates the nature of the relationships between a vibrator and regions of the fluid in which it is immersed.

FIG. 2 illustrates how the near-wavefield, far-wavefield and the device are linked. Distortions are introduced into the signal within the device itself, and are present in the signal at the wet surfaces of the vibrator when it enters the surrounding fluid. Inside the device the relationship between input and output signals is non-linear and possibly unpredictable. Once the signal enters the water close to the vibrator (the near-wavefield) the relationship regions of the fluid becomes linear, but may be complicated because of the complex motion of the outer surface of the device. The near and far-wavefields are also linked by a linear relationship, and the far-wavefield can be simply defined using approximations for the shape of the vibrator once the shape has been determined as accurately as possible using a determination of the wet volume as described below.

Requirements for a material to be linear are that the wavefield generally has a velocity, u, that is small compared with the speed of sound in the medium; the value of the dynamic pressure ($0.5\rho u^2$ where $\rho$ is the density of the material) is small compared with the acoustic pressure, the amplitude of the motion, x, is small compared with the acoustic wavelength, the acoustic pressure is small compared with ambient pressure, and any sound created by vorticity is insignificant. All of these conditions are met for a typical seismic vibrator, such as a marine vibrator located in water (i.e., seawater) or a seismic vibrator located in air. The sound field at two places in a linear medium can be represented by an impulse response.

The shape of the vibrator S(t) defines the volume V(t), but V(t) does not necessarily define S(t), since there may be many possible shapes for the vibrator that have the same volume. For a specific class of devices, the link between S(t) and V(t) is one-to-one, i.e., the device has a particular unique shape S(t) for each particular value of V(t). Such devices are referred to herein as "1 DF devices" meaning there is just one degree of freedom in defining the shape. For 1 DF devices the volume defines the shape.

The overall shape of the vibrator as a function of time, S(t), is enough to define the sound field in the water, p(x, y, z, t). The sound field is represented here as defined by the changes in pressure within a volume of fluid (such as seawater) over time. It may equally be represented by another property of the fluid that is affected by the passage of sound waves, such as an acceleration or velocity of fluid molecules (a(x, y, z, t) or v(x, y, z, t)). If a particular position of interest (x, y, z) is close to the vibrator then an elaborate calculation might be needed. If (x, y, z) is more remote, particularly if it is at a range that is large compared with the size of the device, then a simplified acoustic description might be adequate. If the volume is defined for a 1 DF device, then the shape is defined, and if the shape is defined then the wavefield is defined, both near and far.

An example of a 1 DF device is an idealised single-piston vibrator, whose shape is a cylinder of fixed radius which lengthens and shortens as the piston moves. The single-piston vibrator is a 1 DF device because the volume defines where the piston is located, and this completely determines the shape of the piston and cylinder. An idealised double-piston vibrator is a 1 DF device if the two pistons are constrained to always move in exact contrary motion, but it is not a 1 DF device if the pistons move independently. Many marine vibrator designs approximate to 1 DF devices, in which case V(t) defines the whole wavefield. The relationship will however be different for different designs of device and might not be easy to calculate at all positions. Devices which are not idealised, i.e., they include additional seals and parts, may also behave as 1 DF devices, however the relationship between volume and shape will be more complex.

For some devices the link between shape S(t) and the total volume V(t) is not one-to-one. In this case there can be many different shapes (with different wavefields) that the device can have and that yield the same total volume. For a subclass of such devices the wavefield can be represented as the sum of several component wavefields each of which is characteristic of a 1 DF device with a certain component volume WO. The number of degrees of freedom of the device is equal to the number of components. The total volume of the device is equal to the sum of the component volumes and the wavefield of the device is the sum of the wavefields that would result from each of the component 1 DF devices used in isolation. Such devices are termed herein "multiple DF devices". If the multiple is, for example, 2 then the device has two degrees of freedom and can be represented as the sum of two 1 DF devices. An example of a 2 DF device would be a double ended piston vibrator where the pistons are independently controlled. Each of the two component 1 DF sources is a closed-ended cylinder with a single piston at one end.

Figure 3:
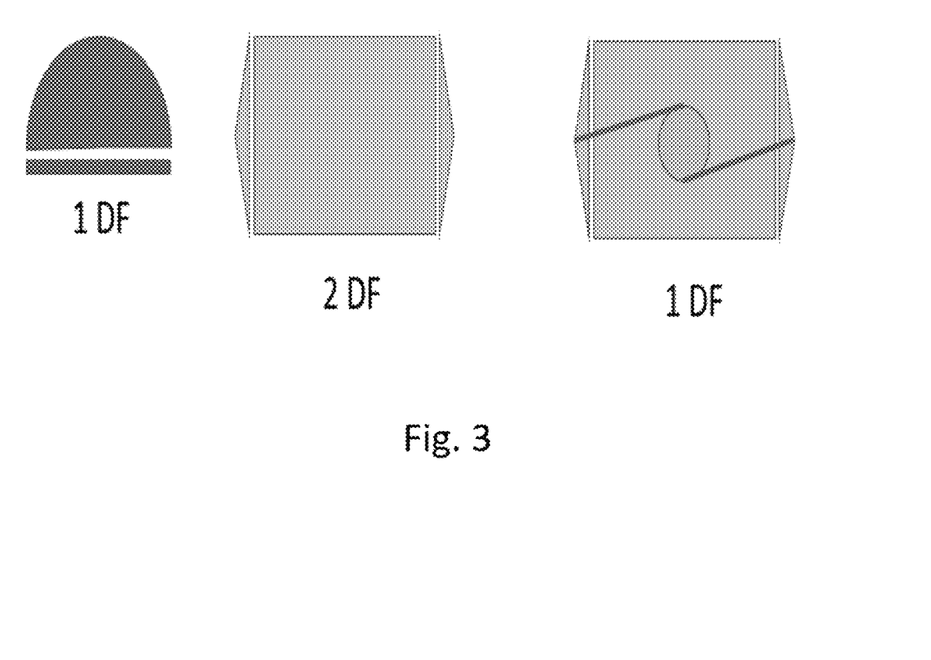
FIG. 3 provides some simple examples of 1 DF and 2 DF devices.
Figure 4:
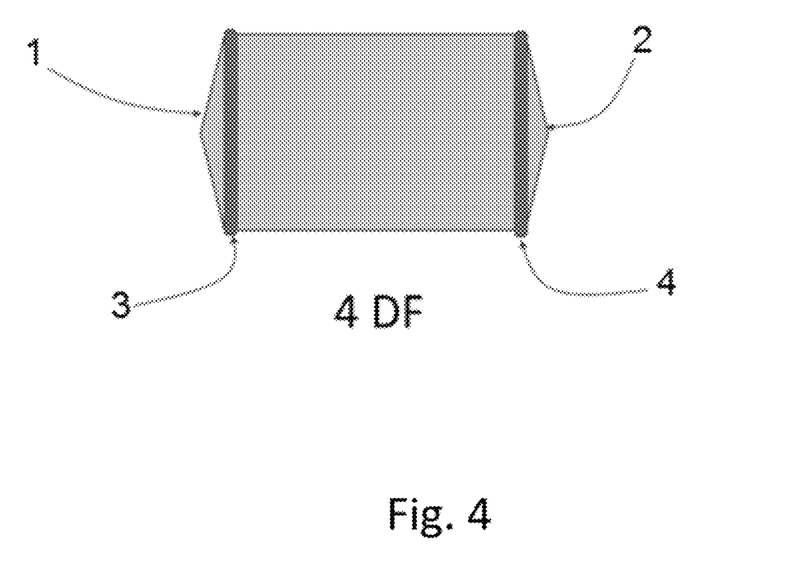
FIG. 4 illustrates a 4 DF device.

FIG. 3 illustrates some examples of 1 DF and 2 DF devices. The device on the left comprises a single moving portion, and for each particular volume of the device, only one position of the moving portion is possible (information about the volume defines what position the moving portion is in). The device in the middle comprises a double piston where each piston can move independently of the other. This is a 2 DF device because there exists more than one combination of positions for the two vibrators that will result in the same wet volume. Where the pistons are constrained to move together, as for the rightmost device in FIG. 3, the device is a 1 DF device. The devices in FIG. 3 are idealized in that they do not include additional components such as seals, which result in additional degrees of freedom for the device and additional complexity in the wavefield created in the surrounding fluid. FIG. 4 illustrates a 4 DF device including two radiators 1 and 2, and two seals 3 and 4. The seals 3, 4 connect each of the two radiators 1, 2 to the body of the device. These seals 3, 4 contribute to the wavefield produced by the device and the movement of the two radiators 1, 2 does not exactly follow the pilot signal, both of which result in distortions in the outgoing wavefield.

The method used to mitigate such distortions in a wavefield produced by an array of vibrators may be adapted to suit situations where the relationship between the volume and the shape is known (i.e. the device is a 1DF device) as compared to a situation where a number of different shapes adopted by the vibrator can have the same volume (i.e. the device is a 2DF device or higher), or situations where the pilot signal has a simpler form such as a sinusoid as compared to a more complex signal. The methods are linked by the fact that they work by the determination of a characteristic property, or a distortion profile, linked to the individual seismic vibrator and the use of this property to mitigate for the effects of distortion on the signal. The methods generally also make use of the linear properties of water in a novel way in order to determine this profile for each vibrator by determining a wet volume V(t) for the device. The distortion profile may represent a relationship between the determined wet volume V(t) and the pilot signal q(t), or between the wet volume V(t) and the value of a property of the water/fluid measured at one or more locations within a certain distance of the vibrator, or may characterise harmonics in the signal produced by a particular vibrator. The distortion profile may in some cases be determined by modelling, but will generally make use of measurements of a property of the wavefield in an area surrounding the device and a calculation of wet volume using these measurements.

Distortions in the signal are a result of the non-linear behaviour of the device itself, and measurements in the water should be linearly related to one another even if they are not linearly related to the pilot signal. In other words, the distortions in the acoustic signal are introduced by movement of the device in response to the pilot signal and are present in the acoustic signal at the interface between the vibrator surface and the surrounding fluid. No further distortions are introduced after this point while the sound wave travels through the water. This means that a distortion profile for the device can be characterised using measurements anywhere in the water, and it is this property that is utilised by the methods herein to reduce the effect of distortions in the signal, or to allow processing of the data which can account for these effects.

For a 1 DF device, the pressure field p(x, y, z, t) at any chosen position (x, y, z) is completely defined by the volume V(t), which itself defines S(t), and the calculation of p(x, y, z, t) (at a particular position) from V(t) can be represented by a convolution of V(t) with an impulse response which describes a variation of pressure at the chosen position as the wet volume V(t) of the source changes. A far-wavefield including distortions introduced when the signal leaves the vibrator can thus be determined using a single sensor measurement taken in the fluid close to the device. From this, a predetermined impulse response can be applied to the sensor measurement to calculate the volume V(t). The volume can be used to calculate a far-wavefield in which the effect of distortions will be evident. This far-wavefield including distortions can be used to correct for the effect of the distortions in the seismic data collected from an array including the vibrator.

The impulse response will depend on the design of the device and the position of the sensor measuring the property of the acoustic wavefield. Where the shape and the volume are one to one (i.e., for a 1 DF device), the value of pressure or another parameter dependent on the wavefield at any point in the water can be calculated from the volume V(t). This means that the variation in pressure within a volume surrounding the vibrator p(t) as well as at every single point in that volume is derivable if V(t) is known. Conversely, V(t) can be derived from a single sensor measurement in the water. This means that the value of the property of the field at any point in the water can, in principle, be derived from the value of the property at one chosen point in the water.

For example, a measurement by a near field hydrophone characterises the pressure field everywhere if V(t), and hence S(t), can be derived from this measurement. This idea is applicable to any case where the measurement is made in the water or another fluid surrounding the device.

Herein, examples refer to pressure as the measured property of the field, however a hydrophone measuring the pressure can be replaced with any other sensor measuring a property of the wavefield via its effect on the surrounding fluid, such as an accelerometer measuring acceleration of the molecules in the fluid or a geophone measuring motion/velocity of the molecules in the fluid.

By determining the volume V(t) of the vibrator as an intermediate step between measurements of the near field and calculation of a far field, distortions relating to non-ideal behaviour of volume/shape of the device over time will be accounted for and will be included when properties of the far field are determined. The relationship between volume and shape also needs to be known, but this is achievable either by measurement or by modelling of the device and its movement.

Although a measurement in the water should enable the calculation of the emitted acoustic signal via the use of an impulse response, there are two difficulties to be overcome. The first is how to convert the measurement into an estimate of the acoustic wavefield. The second is how to represent the acoustic wavefield at large distances. Initially, an estimate of the time-varying wet volume V(t) (or wet volumes if a device with multiple degrees of freedom is used) from one or more measurements made in the acoustic field close to the device is determined. Secondly, the wet volume V(t) (or wet volumes) is/are used to calculate the radiated acoustic signal at larger distances. The far field at any position cannot in this case be directly determined from the measurement in the water relating to the near field without knowledge of the impulse response because the vibrator produces a signal which is not isometric, and any distortions in the signal would not be accounted for.

Using the predetermined impulse response, a measurement of a property of the wavefield at one or more positions in the water close to a vibrator will allow the volume changes of the device over time to be determined. From this, the shape or an approximation of the shape based on the volume is derived and the near-wavefield and/or far-wavefield can be calculated accurately. If the device is a 1 DF device, a measurement at a single position will be required. If the device is 2 DF or higher, the device may be able to be treated as a combination of 1 DF components. In such a case, one measurement per degree of freedom will need to be taken at different positions in the vicinity of the device in order to be able to determine the contribution arising from each of the components.

The impulse response (from V to p, for example) can be derived from modelling or from experiment, and can then be inverted by standard time-series analysis methods to give a convolutional operator which will convert p(t) to V(t). This operator will be different for different designs of device and for different positions of the sensor, but once determined for the device it can be used with the same sensor system again and again.

A hydrophone measuring the pressure of the water is particularly suitable for use as the sensor, however other sensors measuring a property of the water affected by the wave field such as acceleration or velocity can be used instead or in addition.

In an example where the vibrator is a double-piston vibrator and the pressure is measured as the property of the acoustic wavefield near to the device, a hydrophone is placed a metre or so from the device. The hydrophone is then used to measure the pressure p(t). Since V(t) and p(t) are coupled by a linear medium (water) the relationship between the two can be completely characterised by an impulse response. This response can be derived, for example, by a numerical calculation of the entire wavefield near the device, or it could be derived by an experiment. The impulse response (the V-to-p operator) will be a characteristic of the device and, in principle, only needs to be determined once and stored. The inverse operator (the p-to-V operator) of the impulse response is then calculated using standard signal processing methods. After this inverse operator has been determined for the device, in order to calculate V(t) from any particular use of the device it is only necessary to convolve the measured p(t) with the corresponding p-to-V operator. The impulse response therefore represents a relationship between a property of the wavefield at a particular position and the actual volume of the device producing that reading (rather than the shape).

Once V(t) has been determined it remains to calculate the pressure at any desired range and direction. For a 1 DF device or each component of a multi-DF device, V(t) defines the whole shape of the device S(t) and, in principle, a full wavefield calculation can be done. Usually this is not needed at ranges beyond about 5 metres (for the far-wavefield) and the device can be represented in a simpler way. For a general fluctuating shape S(t) it is sometimes complicated and time consuming to calculate the pressure field p(x, y, z, t). For ranges that are large compared with the size of the device some simplifications can be applied. The simplifications are two-fold. Firstly, the physical device is replaced with water and the moving surfaces are replaced by fluctuating volume sources. There is therefore no sound scattering from the body of the vibrator; the sound propagates through the structure as if it were water. Secondly, the fluctuating surfaces are replaced by simplified generic forms for which solutions are known or are easy to obtain numerically. A circular conical piston might, for example, be replaced by a flat pulsating disk. The pulsating sphere and the pulsating rigid disk are two such simplified forms (Beranek and Mellow, 2019). General planar sources can be calculated using a simple numerical integral (Ross, 1976). If the device can be represented by a collection of such simplified forms, then the acoustic wavefield can be calculated by simple superposition and the calculation is fast. This simplification is not necessary, however, and the full calculation can be carried out. This method allows the far wavefield including distortions to be accurately estimated without the requirement of additional far field hydrophones.

In a particular example, in a double piston vibrator that is about 2 metres long and 1 metre in diameter operating at 3-150 Hz, the pressure field at a range of 5 metres or more is adequately represented as being that due to a pair of monopoles, located at centres of the two pistons. For this device, the far-wavefield will therefore be the wavefield within a volume of fluid located at or above around 5 meters from the device. Each monopole having a volume of V(t)/2 where V(t) is the total volume of the vibrator. In this context 'adequately' means with an error of less than 0.5 dB in level and 3.4 degrees of phase (Laws and Kragh 2002). At distances less than about 5 metres this representation is not adequate. A double piston vibrator can also be represented as a single monopole: a pulsating sphere with volume V(t), which might be adequate at low frequencies. As another option, the double piston can be represented as a pair of pulsating disks located at the positions of the two pistons. Other more elaborate representations are also possible.

Whether or not such a simplification is used to calculate the far-wavefield, the measurement of V(t) used to calculate it will include distortions (unexpected changes in V(t) which do not correspond to the expected effect of the pilot signal). The calculated far-wavefield is therefore usable to correct for these same distortions in the seismic data produced using an array including the vibrator. Although V(t) can in principle also be estimated from a sensor measurement of the far wavefield by representing the source in a simple way as discussed above, this will be much less effective than taking measurements of the near-field, using a pre-determined impulse response to calculate V(t), and then calculating the far-wavefield. The reason for this is that positioning the sensor correctly to measure the far-wavefield is difficult, and perhaps more crucially that the vibrator will, in use, be part of an array of vibrators. Removal of the signals from surrounding vibrators functions best when using a measurement at close range.

Examples of the above method as applied to the device shown in FIG. 4 will now be described. The device is a circular cylinder several metres long (i.e., between 2 and 6 meters long) and about 1 metre in diameter, with a radiator piston (1; 2) at each end and that operates up to a frequency of around 150 Hz. Each radiator is connected to the body of the device by a flexible annular seal (3; 4). The seals serve to make the whole vibrator watertight. The sound radiation from the seals is not negligible and needs to be accounted for in the far field signature.

An electrical pilot signal commands the outward displacement of the two radiators. The actual radiator displacements do not exactly follow the pilot signal and they might not exactly match each other. The volume of water displaced by each radiator typically depends on its actual displacement in a simple way. Flexible seals, however, behave in a more complicated way and their displaced volume is not simply related to the pilot signal the actual radiator displacement. The behaviour of the parts might be related to the pilot signal in a non-linear way and distortion can be introduced into the acoustic signal. The method described here estimates the actual emitted acoustic signal, including such distortion.

The behaviour of all the parts of the vibrator in this case has rotational symmetry about the axis of the vibrator. As mentioned above, although distortions are introduced while volumes of the various parts of the device fluctuate in response to the pilot signal, there is no distortion introduced by the water itself, because sound propagation in water is a linear process.

The device shown in FIG. 4, and similar devices, can be considered as having using four degrees of freedom: one for each seal and one for each radiator. In this example four sensors are therefore used, this being the minimum number needed to characterise each of the four degrees of freedom. The minimum number of sensors required to characterize a device with multiple degrees of freedom will generally be equal to the number of degrees of freedom of the device. For a 2 DF device, therefore, 2 sensors will be the minimum required to accurately define the wet volume V(t).

The sensors in this case may include two acceleration sensors, measuring $Acc1(t)$ and $Acc2(t)$, which measure the outward acceleration of radiators and two hydrophones, measuring $Ph1(t)$ and $Ph2(t)$, mounted on the vibrator body or inside it with a connecting channel to the outside such that they measure a property of the fluid surrounding the vibrator rather than the movement of the parts directly. There is one hydrophone close to each of the seals. The hydrophones measure the acoustic pressure in the water even though they might be physically located inside the body of the vibrator. In such a case a fluid passage connects the sensor to the surrounding fluid.

In a more advanced embodiment, it would be possible to replace each sensor with a linear combination of a group of sensors. For example, many accelerometers could be mounted on the radiator face and could be averaged or combined in some other way to give the Acc1(t) signal. Alternatively, or in addition, several hydrophones might be placed circumferentially around the vibrator and averaged or combined in some way to give the Ph(t) signal. This might be advantageous, for example, if there is significant flexing of the radiator or if there is azimuthal variation in the seal behaviour.

A pair of linear operator responses (op0) is calculated using Computation Fluid Dynamics (CFD), Fluid Solid Interface (FSI), or similar calculations or experiments. Each op0 operator links a radiator-mounted accelerometer to the acceleration of the displaced volume of that radiator. These relationships can be characterized by:

$$V''\text{rad1}(t) = op0\_1 * Acc1(t); \text{ and}$$

$$V''\text{rad2}(t) = op0\_2 * Acc2(t)$$

where V"rad1(t) denotes the time series of volume acceleration due to radiator number 1, V"rad2(t) denotes the time series of volume acceleration due to radiator number 2, and "*" denotes convolution. If the radiator is completely rigid, then the operator is simply a delta function whose amplitude is equal to the area of radiator.

Another set (op1) of linear operators is calculated using CFD, FSI, or similar calculations or experiments. These operators, which number 4 in this example, link the radiator displaced volume accelerations to the two pressure components sensed by the hydrophones Ph1 and Ph2. op1_12, for example, links the volume acceleration of radiator number 1 to the pressure sensed by hydrophone number 2, op1_11 links the volume acceleration of radiator number 1 to the pressure sensed by hydrophone number 1, op1_22 links the volume acceleration of radiator number 2 to the pressure sensed by hydrophone number 1, and op1_21 links the volume acceleration of radiator number 2 to the pressure sensed by hydrophone number 1. These operators do not include any contribution from the movement of the seals.

Another set (op2) of linear operators is calculated using CFD, FSI, or similar calculations or experiments. These operators, which again number 4 in this example, link the two seal volume accelerations to the two pressure components sensed by the hydrophones Ph1 and Ph2. Op2_12(t) for example, links the volume acceleration of seal number 1 to the pressure sensed by hydrophone number 2 (and so on as for op1 above). These operators do not include any contribution from the movement of the radiators.

The operator responses depend not only on the shape of the accelerating volumes, but also on the shape of the solid stricture of the vibrator and other nearby equipment which can disturb the acoustic wavefield. The operators are linear because sound propagation in water is a linear process. However, the movement of the seals is not necessarily a linear function of the movement of the radiators. There might, for example, be harmonic distortion introduced by the seals. The effect of such distortion on the far field sound will be correctly included.

The total pressure sensed the two hydrophones is thus:

$$Ph1(t) = op1\_11 * op0\_1 * Acc1(t) + op1\_21 * op0\_2 * Acc2(t) + op2\_11 * V''\text{seal1}(t) + op2\_21 * V''\text{seal2}(t); \text{ and}$$

$$Ph2(t) = op1\_12 * op0\_1 * Acc1(t) + op1\_22 * op0\_2 * Acc2(t) + op2\_12 * V''\text{seal1}(t) + op2\_22 * V''\text{seal2}(t).$$

In addition, the following two equations, which have already been given above, are required for the calculation:

$$V''\text{rad1}(t) = op0\_1 * Acc1(t); \text{ and}$$

$$V''\text{rad2}(t) = op0\_2 * Acc2(t).$$

There are four unknowns in the above four equations, and these correspond to the four degrees of freedom. The unknowns are the four volume accelerations V"rad1(t), V"rad2(t), V"seal1(t), V"seal2(t). The problem is well posed if hydrophone one is placed closer to seal 1 than it is to seal 2 and hydrophone 2 is placed closer to seal 2 than it is to seal 1. In such a case the solution will converge more quickly. It is straightforward to solve the four equations for the four unknown volume accelerations.

More specifically, a solution can be found by solving the second two equations above together to find V"rad1(t) and V"rad2(t). V"rad1(t) and V"rad2(t) can then be substituted into the first two equations to give:

$$op2\_11 * V''\text{seal1}(t) + op2\_21 * V''\text{seal2}(t) = Ph1(t) - op1\_11 * V''1(t) - op1\_21 * V''\text{rad2}(t); \text{ and}$$

$$op2\_12 * V''\text{seal1}(t) + op2\_22 * V''\text{seal2}(t) = Ph2(t) - op1\_12 * V1(t) - op1\_22 * V''\text{rad2}(t).$$

The right side of these equations represents the signal sensed by the hydrophones that has originated only from the seals. In a vibrator array further terms will be needed on the right to remove the pressure fields that have originated from other sound sources in the array and from the signals reflected in the sea surface and sea bed.

These equations can be solved, for example, iteratively. The equations are rearranged as shown below and the inputs V"seal1(t) and V"seal2(t) are initially both set to zero. The equations are then iterated several times with V"seal1(t) and V"seal2(t) being updated each time. If the hydrophone positions have been well chosen convergence is rapid. The rearranged equations are as follows:

$$V''\text{seal1}(t) = (Ph1(t) - op1\_11 * V''1(t) - op1\_21 * V''\text{rad2}(t) - op2\_21 * V''\text{seal2}(t)) * [op2\_11] - 1; \text{ and}$$

$$V''\text{seal2}(t) = (Ph2(t) - op1\_12 * V1(t) - op1\_22 * V''\text{rad2}(t) - op2\_12 * V''\text{seal1}(t)) * [op2\_22] - 1,$$

where [op2_22]−1 denotes the inverse operator of op2_22.

Once the four volume accelerations have been computed it is straightforward to calculate the far-field pressure by using the simplified description of the wavefield in the far-field, which may be beyond about 5 metres, as being that of two monopoles, described by the equation:

$$p(r1, r2, t) = M1(t - r1/c)/r1 + M2(t - r2/c)/r2,$$

where p(r1, r2, t) is the pressure at an arbitrary chosen position in the water in the far field (which in some cases will be beyond about 5 metres from the vibrator), c is the speed of sound in water, r1 is the distance of the arbitrary chosen position from the centre of radiator number 1, and r2 is the distance of the arbitrary chosen position from the centre of radiator number 2.

The two monopole source functions are given by:

$$M1(t) = (V''\text{rad1}(t) + V''\text{seal1}(t)) * \text{rho}/(4 \cdot \text{pi}); \text{ and}$$

$$M2(t) = (V''\text{rad2}(t) + V''\text{seal2}(t)) * \text{rho}/(4 \cdot \text{pi}),$$

where rho is the density of water and T is relationship between the volume acceleration. The monopole source function is well known to those skilled in the art.

In this example the far field is represented by the sum of two monopoles. If it were necessary, the far field representation could include the fields of the seals separately from the radiators. Alternatively, a far-field representation based on two pulsating disks could be used. The choice of far-field representation depends on the degree of accuracy required, the highest frequency of interest, and the shape of the device.

For a symmetrical device, where the two radiators move in phase, both moving outwards at the same time and both moving inwards at the same time with the same motion, the two radiator volume accelerations will likely be similar, and the two seal volume accelerations will likely be similar. However, the method does not assume this and, as a result, unsymmetrical behaviour is properly accounted for.

If the device operates such that the two radiators move substantially in antiphase, with one moving outwards as the other moves inwards, the method will still correctly estimate the pressure field at large distances.

The operators op0, op1, op2 are linear and time-invariant. This is because the water is a linear medium and the operators link volume accelerations with pressures of a sound wavefield in that medium. It is not a requirement that the motion of the seals and radiators be a linear function of the pilot signal. The method accounts for nonlinear behaviour in the device, which can create distortion in the emitted acoustic signal. Such distortion is correctly measured by the method and the calculated far field signature includes the distortion that the vibrator has generated.

Although several operators (op0, op1, op2) are needed that link the dynamic behaviour of the moving parts to the sensor signals the method does not require a general description of the acoustic wavefield at arbitrary positions near the device, only at the actual positions of the sensors. Furthermore, the operators are functions of the device, not of the particular pilot signal that is used. They can therefore be generated once and then stored as an intrinsic property of the device, or as part of a profile for the device. The calculation of the far field is completely general: the field can be calculated anywhere.

For a symmetrically arranged vibrator some of the operators are related to each other, however this does not imply that the signals they operator on are similar. For example, the two radiators might not move in an exactly symmetrical way and might have different volume accelerations. Nevertheless, the operators that convert those volume accelerations to the sensed pressures will be the same if the device layout is symmetrical. For example, the relationship between operators may be described by the following in the case of the vibrator shown in FIG. 4:

$op0\_1 = op0\_2;$ $op1\_11 = op1\_22;$ $op1\_12 = op1\_21;$ $op2\_11 = op2\_22;$ and $op2\_12 = op2\_21.$ The above method is applicable to vibrators having 3 degrees of freedom or more than four degrees of freedom. The number of sensors required will be larger if more degrees of freedom need to be accounted for, and hence the number of equations and unknowns also higher, but the method in which these are solved will be similar.

In another example the same or a similar device comprising two radiators and two seals is treated as if it is perfectly symmetrical, such that the number of degrees of freedom is considered as two: one for a seal (both behaving the same way) and one for a radiator (both behaving the same way). In this simpler embodiment the hydrophone could be symmetrically placed and a single Acc data channel would be simply the average of the two radiator-mounted outwards sensing accelerometers. Symmetrically placed refers to a placement of the sensor such that the distance to each of the two radiator is substantially equal. The sensor will thus sense the two radiators equally. This case is described by the equations:

$Ph(t) = 2*op1*op0*Acc(t) + 2*op2*V''seal(t);$ and $V''rad(t) = op0*Acc(t),$ where the linear operators function as follows: op0 converts Acc(t) to V''rad(t), op1 converts V''rad(t) to Ph(t), and op2 converts V''seal(t) to Ph(t).

The solution of these two equations for the two unknowns V''seal and V''rad is straightforward. The far field is then calculated using the two monopoles positioned at the radiator centres:

$M1(t) = (V''rad(t) + V''seal1(t))*rho/(4 \cdot pi);$ and $M2(t) = M1(t),$ and the far field is calculated using:

$p(r1, r2, t) = M1(t - r1/c)/r1 + M2(t - r2/c)/r2,$ where p(r1, r2, t) is the pressure at an arbitrary chosen position in the water in the far-field (such as beyond about 5 metres from the vibrator) and c is the speed of sound. r1 is the distance of the arbitrary chosen position from the centre of radiator number 1 and r2 is the distance of the arbitrary chosen position from the centre of radiator number 2.

A small refinement to this simpler example is that the two accelerometers, whose sum is Acc(t), can be compared to see if they have substantially the same value. If their difference is not zero, then this would indicate that the assumption of symmetry is not valid and the method accounting for four degrees of freedom is employed.

In a full implementation of the method it will be required to remove from the hydrophone measurement p(t) the signal that has originated other than directly from the vibrator itself. In practice this signal will have come from other vibrators in the array and from the reflection of the signal from all the vibrators in the sea surface. Where a seismic vibrator is used as the source, a correct representation of the fields of the devices is needed.

Using the steps defined above, a measurement from a single near field sensor can be used to calculate the entire acoustic wavefield of an array of marine vibrators for a 1 DF device. Measurements from two or more sensors can be used to calculate the entire acoustic wavefield of the array for devices of more than 1 DF, in which case the minimum number of sensors required will be small and will be equal to the number of degrees of freedom for the device. As mentioned above, in some cases devices of multiple degrees of freedom can be considered as simpler devices having fewer degrees of freedom, but the calculation will then generally be a bit less accurate. The calculated field will include any distortion that the device has created, and this can possibly be mitigated by subsequent processing of the seismic data, for example using source signature deconvolution. Alternatively, the pilot signal can be adjusted to try to minimise the distortions in the signal (i.e., to bring the near or far wavefield closer to what would be expected to be produced by an ideal device such as an ideal double piston vibrator without additional seals and other elements which tend to introduce the distortion).

Using a similar principle, the non-linear behaviour of the vibrator can be characterised and used to apply a cancellation component to the pilot signal in order to correct for distortions by reducing or removing these distortions from the signal. Again, the function describing the non-linear behaviour will be individual to the particular device and needs to be determined for each vibrator to be used in the survey (in a similar way to the impulse response of the previous embodiment). Here, the distortion profile, rather than describing a relationship between the volume V(t) and the value of a property of the wavefield in the water close to the device, describes a relationship between the volume V(t) and the pilot signal q(t) that is applied to the device. This can, however, still be determined using a sensor measurement taken in the water by first determining a wet volume.

When the behaviour of the vibrator is non-linear, the output from two components of the pilot signal will not be equal to the sum of the separate outputs which would be measured if the input components were applied to the vibrator separately. Instead, the summed output will include an additional component which represents the distortion in the signal. For a sinusoidal input pilot signal, the distortions in the output signal are generally in the form of harmonics, although intermodulation is also possible if the non-linearity is severe. A weakly non-linear system, subject to two sinusoidal inputs at different frequencies, can generate harmonics at frequencies that are multiples of each of the two input frequencies. A strongly nonlinear system can also generate intermodulation signals at frequencies that are equal to the sum and difference of the two input frequencies.

This shortcoming might be due to aspects of the mechanical design that are difficult to avoid. For example, in a flextensional vibrator an actuator might be used that controls the length of the major axis of the ellipsoidal shell. Even if this actuator is made to follow exactly the pilot signal the volume might not be a linear function of the pilot signal because the volume is not a linear function of the actuator length.

If the non-linear nature of the device is characterised (e.g., the volume/shape as a function of pilot signal) then the pilot signal can be modified such that the volume of the device becomes a linear function of the modified pilot signal and the distortion is removed from the acoustic output. This means that the pilot signal is adjusted so that the acoustic signal at the interface between the vibrator outer surface and the fluid or water in which it is submerged is as for a vibrator of ideal shape (i.e., a double piston vibrator without the seals and other parts which have introduced the distortion). The required modification might be determined from an understanding of the detailed motion of the device. This does not necessarily require the use of a sensor such as a hydrophone or accelerometer, as in the previous technique, but it might make use of such measurements. In principle, a particular nonlinear transformation, T, can be applied to the pilot signal so that the volume becomes a linear function of the modified pilot signal even though the actuator position is not a linear function of the modified pilot signal.

A direct way to develop this particular nonlinear transformation is to model the shape of the device in detail and calculate it. However, to do this requires a detailed knowledge of V(t) for a given actuator displacement x(t), which is not always easy to obtain directly from the shape, for example if the device is a multi-DF device.

An indirect way to determine V(t) is to perform a test, for example using a remote hydrophone. The remote hydrophone must be placed at a distance where the details of the shape of the vibrator are less significant and a simple representation of the field is adequate. Such a representation does not depend on small details of the shape. Typically, this means it should be placed at a distance large compared with the physical dimensions of the device, i.e., a distance of more than 5 meters from the outer surface of the vibrator, preferably at a distance of around 10 meters from the vibrator outer surface.

One implementation of this might be as follows. A two-metre long double ended piston vibrator is tested. The pilot signal is a broad-spectrum waveform. The pressure is measured by a hydrophone at a range of around 10 metres from the device positioned within the symmetry plane of the device where the pressure field is simple to calculate from the approximate shape. For example, if the field at the chosen hydrophone position is accurately enough represented as a single monopole then the Notional Source of the device can be calculated using: $N(t)=r*p(t+r/C)$, and the volume is computed by double integration of $d^2V/dt^2 = N(t) \cdot \rho/(4\pi)$. Since the pilot tone q(t) and the volume V(t) are then both known it is straightforward to derive a non-linear transformation T of q such that V(T(q(t))) is a linear function of q(t). This principle can be applied to any shape of vibrator, particularly commonly used and fairly simple shapes such as single and double piston vibrators.

The transform that must be applied to the pilot signal will be different for different devices but will not depend on the particular pilot signal. It will instead depend on properties of the device itself. This means that one the transform is calculated for a device, it can be used again and again to linearize the relationship between the volume and the pilot signal. This then enables the distortion to be removed from the emitted wavefield.

If the device is being used to emit a sinusoidal waveform, either as a single tone or a frequency sweep, any distortion will manifest itself as harmonics. Since the water is linear, if a particular harmonic is absent in the pressure field at a chosen hydrophone then it will be absent at all positions provided the chosen hydrophone is not placed at a node of pressure. No knowledge of the relationship between the pilot signal and the volume is required to remove these distortions from the signal, but a measurement of a property of the wavefield in the water is used to determine a distortion profile for the device, and potentially to remove or reduce, distortions in the signal produced by the device.

Distortions can be removed by adding a cancellation signal to the pilot signal which exactly cancels the distortion. This can be done by calculating a transform or impulse response characterising a relationship between the pilot signal and volume and described above, however this achievable in a simpler way if a sinusoidal signal is being emitted because the distortion manifests itself as harmonics and these are easy to identify. Each harmonic is identified and nullified by addition of a tone, with suitable amplitude and phase, to the pilot signal.

The procedure might be implemented as follows for a device that is intended to emit a swept-frequency sinusoid. The example refers to a hydrophone used to measure a pressure in the water, but again any property of the water affected by the wavefield can be measured using a suitable sensor, such as an accelerometer measuring an acceleration of water molecules, since harmonics will be identifiable also in those sensor readings. Firstly, the device is set to emit a sinusoidal wave at a frequency f using, for example, the pilot signal s=a*cos(2·π·f·t). Secondly, the sensor (in this case a hydrophone) is used to determine how much energy is present in the wavefield at 2·f. An extra signal is added to the pilot signal at 2·f to adjust the amplitude and phase which results in the energy at 2·f which would be detected by the hydrophone being close to zero. The pilot signal is then described by the following equation: s(t)=a1·cos(2·π·f·t)+a2·cos(2·π·2·f·t+φ2). The process then moves to 3f and is repeated resulting in a revised pilot signal described by the equation: s(t)=a1·cos(2·π·f·t)+a2·cos(2·π·2·f·t+φ2)+a3·cos(2·π·3·f·t+φ3). φ(n) represents the cancellation signal or correction signal added to the pilot signal in order to cancel the $n^{th}$ harmonic from the acoustic signal. The process then continues up the harmonics until the frequencies are of no interest. This process is particularly straightforward if, as is usually the case, V(t) is predominantly linear with smaller non-linear terms.

Each extra signal added to the pilot signal will have an effect on the harmonic that is being attenuated and also those at higher frequencies, which are yet to be attenuated by modification of the pilot signal. This is because the link between the pilot signal and the sound is not perfectly linear. The extra signal will not usually alter harmonics at lower frequencies which have already been removed or attenuated. The method will therefore work best if harmonics are attenuated by modification of the pilot signal in turn and increasing in frequency up the harmonics.

The procedure is performed for a range for frequencies until a complete set of φ(N) and A(N) has been determined. It is then straightforward to use this correction signal to modify the pilot signal. The resulting output signal will have no harmonics.

Figure 5A:
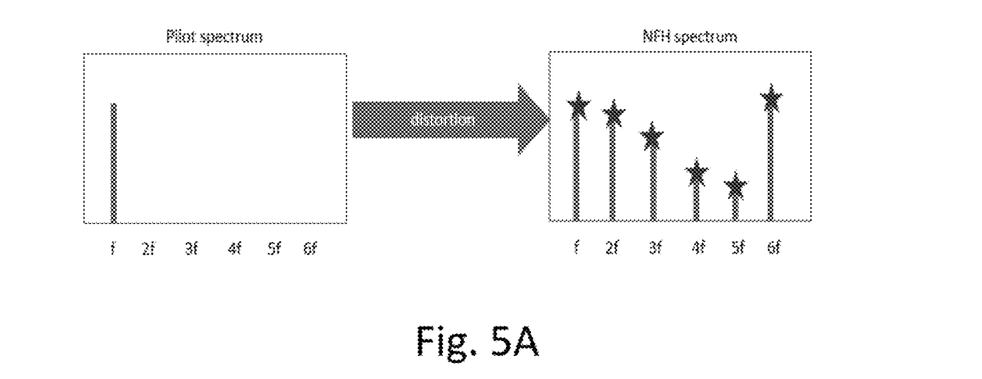
FIGS. 5A to 5F illustrate the steps in a method for reducing distortions in a wavefield where the pilot signal is sinusoidal.
Figure 5B:
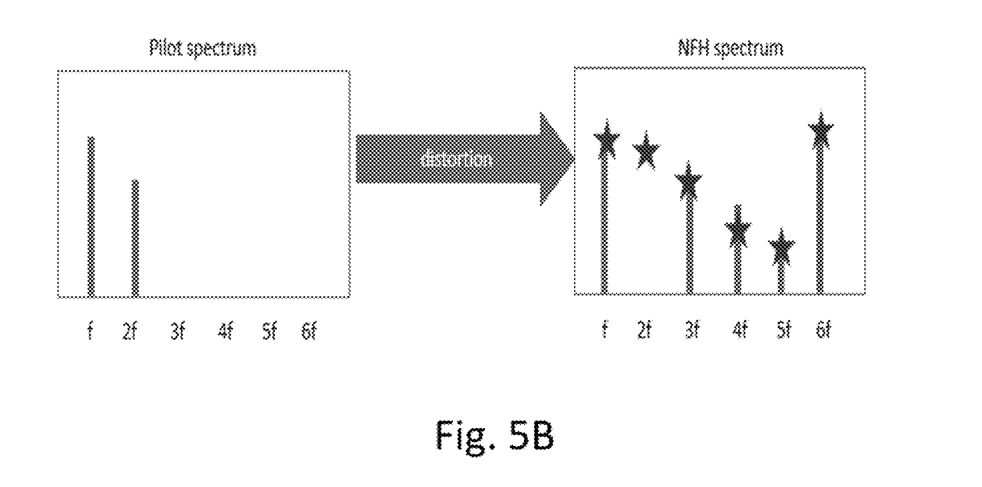
Figure 5C:
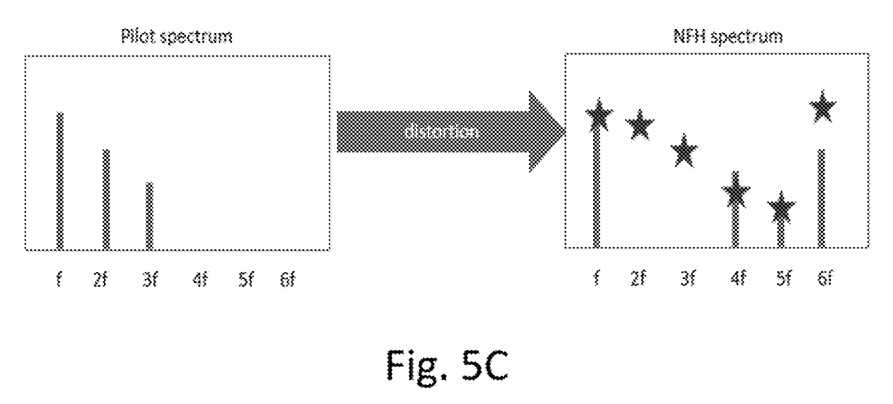
Figure 5D:
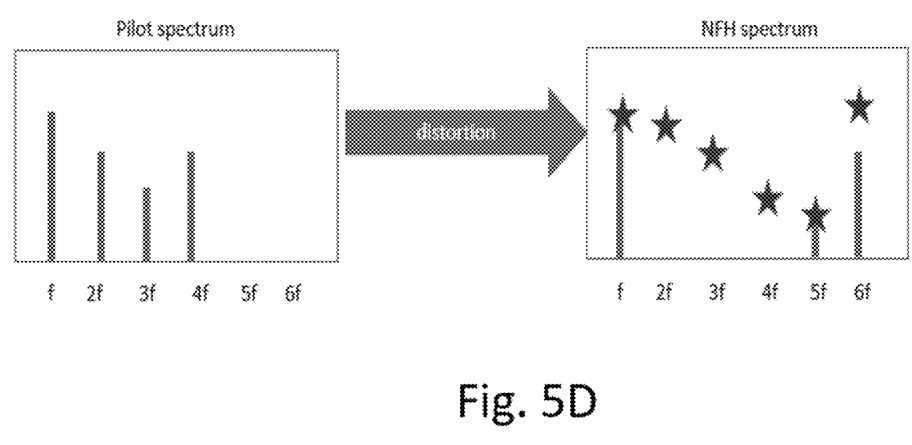
Figure 5E:
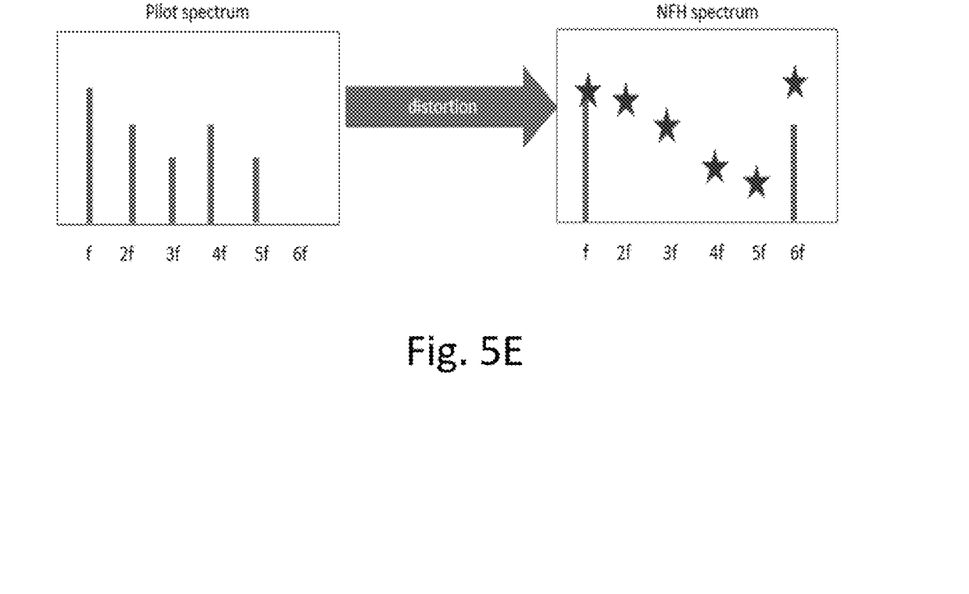
Figure 5F:
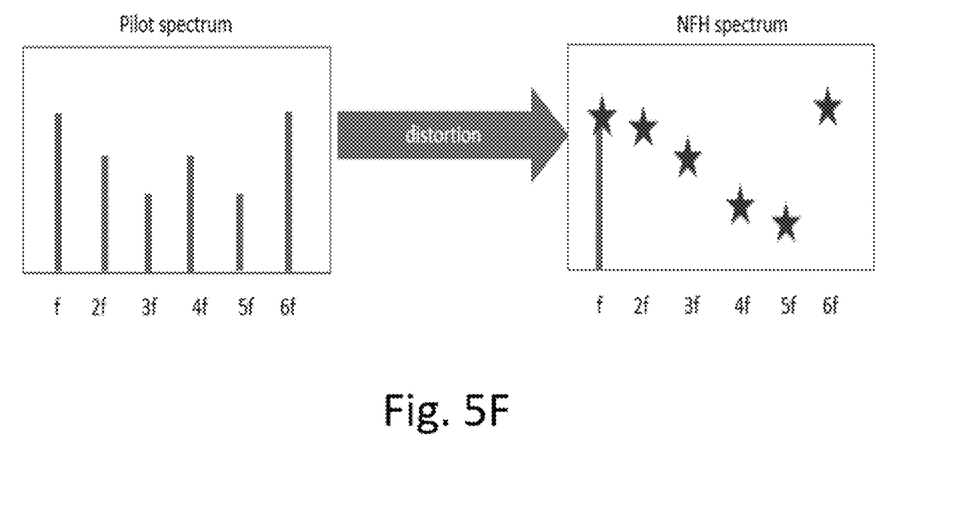

FIGS. 5A to 5F illustrate this method. FIG. 5A illustrates the input (pilot) and output (wavefield) signals before the correction/distortion profile is determined and the correction is applied. The pilot signal is a sinusoidal signal having a frequency f. The near field hydrophone measures energy in the wavefield at 2f, 3f, 4f, 5f, 6f, and so on for higher harmonic frequencies. The energy in the signal at the first harmonic frequency, 2f, is determined and a cancellation signal applied to the pilot signal. FIG. 5B shows the resulting corrected pilot signal and hydrophone measurement of the near-wavefield. The effect of the distortion producing energy in the signal at 2f is removed or corrected for. The energy in the acoustic wavefield at a frequency 3f is then determined from the hydrophone or sensor signal and the appropriate cancellation component is applied to the pilot signal (resulting in the pilot signal and wavefield shown in FIG. 5C). The same process is carried out to remove the excess energy at 4f (FIG. 5D), at 5f (FIG. 5E), and at 6f (FIG. 5F). Once all of the additional energy at the harmonic frequencies has been corrected for, the wavefield is measured as having a frequency of f, as was intended. The distortion profile or correction profile for the device has been determined (by calculating the energy at each of the harmonic frequencies in turn) and distortions have been corrected for (by adjusting the pilot signal).

The procedure can be performed as part as part of the device design. It can alternatively be carried out as part of a calibration sequence during seismic data acquisition. Rather than a series of single frequency tones, the procedure can use a frequency sweep. Indeed, the planned sweep to be used in the survey could itself form the calibration waveform. The process can also be one of progressive iterative improvement and could therefore be performed as the seismic data are collected.

Note that this process does not require any knowledge of the shape of the device, or on how V(t) depends on the actuator position. It relies entirely on the linear nature of the sound propagation in the water.

Use of this method will enable a swept frequency sinusoidal vibrator to emit a harmonic-free wavefield even though the nonlinear relationship between the pilot signal and the volume is not known. As for the other methods described above to determine a distortion profile for a particular vibrator, the cancellation signal or signals that must be added to the pilot signal will be different for different devices, and will be individual to the device or to the particular design of the device.

We claim:

1. A method for correcting for distortions in a seismic acoustic signal produced by a seismic vibrator immersed in a fluid, the method comprising:
   determining a relationship between a pilot signal as a function of time q(t) and a wet volume as a function of time V(t); and
   based on the determined relationship, applying a non-linear transformation, T, to the pilot signal so that the wet volume V(t) becomes a linear function of the modified pilot signal.

2. The method according to claim 1, wherein determining the relationship between the pilot signal and the wet volume, and thus determining the non-linear transformation to apply, comprises performing a computer simulation of the behaviour of the vibrator.

3. The method according to claim 1, wherein the non-linear transformation is determined by experiment.

4. The method according to claim 1, wherein the non-linear transformation is determined by applying the pilot signal to the seismic vibrator such that an acoustic wavefield travels outwards from an interface between the seismic vibrator outer surface and the fluid,
   using a sensor to monitor a property of the acoustic wavefield within the fluid as a function of time,
   using the measured property to determine the wet volume of the seismic vibrator as the function of time V(t), and
   determining the non-linear transformation from V(t) and the pilot signal q(t).

5. The method of claim 4, wherein the sensor is located at a distance of greater than 5 meters from the seismic vibrator outer surface and the fluid is water.

6. A system configured to correct for distortions in a seismic acoustic signal produced by a seismic vibrator immersed in a fluid by being configured to:
   determine a relationship between a pilot signal as a function of time q(t) and a wet volume as a function of time V(t); and
   based on the determined relationship, apply a non-linear transformation, T, to the pilot signal so that the wet volume V(t) becomes a linear function of the modified pilot signal.

* * * * *